A. H. LEIPERT.
TANDEM REAR DRIVE FOR MOTOR VEHICLES.
APPLICATION FILED JUNE 7, 1920.

1,402,301.

Patented Jan. 3, 1922.

WITNESS

INVENTOR
August H. Leipert
BY
Redding & Greeley
ATTORNEYS

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

TANDEM REAR DRIVE FOR MOTOR VEHICLES.

1,402,301.    Specification of Letters Patent.    Patented Jan. 3, 1922.

Application filed June 7, 1920. Serial No. 386,951.

*To all whom it may concern:*

Be it known that I, AUGUST H. LEIPERT, a citizen of the United States, residing in the borough of Queens, of the city of New York, in the State of New York, have invented certain new and useful Improvements in Tandem Rear Drives for Motor Trucks, of which the following is a specification, reference being had to the accompanying drawing, forming a part hereof.

The advantages of so-called tandem rear drives for motor vehicles in which a plurality of drive wheels is employed have been long recognized in the automotive industry. The saving in weight, the saving in tires and the reduction in heavy wheel loads on roads are advantages of considerable importance over the usual two-drive wheels which constitute the main load carrying wheels in ordinary constructions. However, the practical results achieved in drives of this type have been limited due in a large measure to a positive interconnection of the several drive wheels in such manner as to prevent independent differential movement as between any two of the wheels. In the drives employed it has been proposed merely to duplicate for each pair of wheels the usual differential element therebetween but no provision has been made for differential movement as between the drive shafts of different pairs of wheels. In accordance with the present invention it is proposed to overcome the objections which have been found in practise to known constructions by introducing operatively between the drive shafts of different pairs of wheels differential gearing which will permit at all times ready differential movement between any two of the shafts employed in propelling the vehicle. This construction may be embodied in many different forms and it is not proposed by the accompanying illustrations of one embodiment to limit the precise means for practising the invention. In the drawing—

Figure 1:
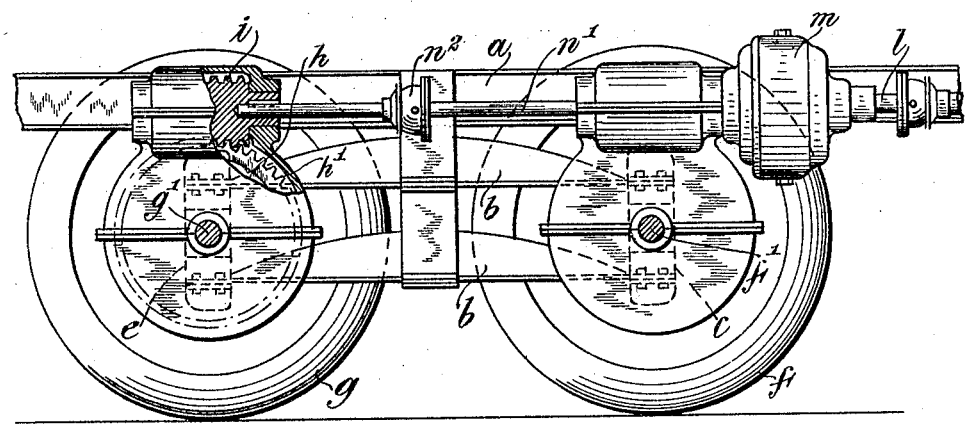
Figure 1 is a view somewhat schematic one of the side frame members of a motor truck in which are employed tandem rear wheels, one of the wheels of each of the pair being illustrated.
Figure 2:
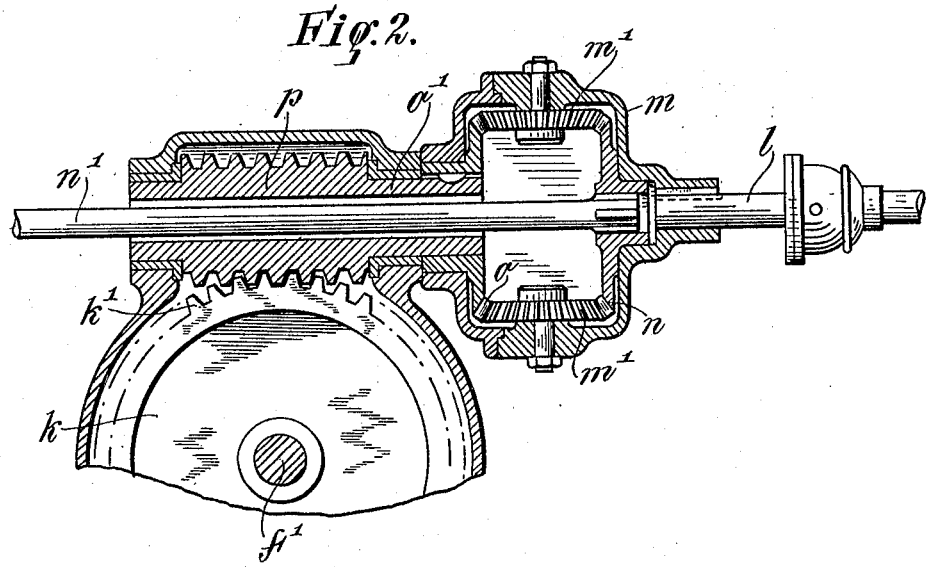
Figure 2 is a detail view in section showing the means for interposing differential gearing between the driving units of the two pairs of wheels.

As the description proceeds it will become evident that the invention is not to be limited to the employment of only two pairs of drive wheels in a vehicle since the number of pairs can be multiplied and the improvements associated with all such pairs. Nor is the invention to be limited to any particular form of drive nor to the relationship of parts in the vehicle structure. A conventional type of vehicle and drive is illustrated.

In the drawing, one of the side frame members $a$ of a motor truck is shown as supported by means of dual springs $b$ the ends of which are carried on dead axles $c$, $e$ for the drive wheels $f$, $g$, respectively. The drive wheels are mounted at the ends of the axles $c$, $e$, in pairs and the illustrated drive can be considered as a tandem drive in that two such pairs are employed. The wheels of each pair are driven by axle sections, one of which for each pair is illustrated at $f'$, $g'$. Two such axle sections are provided for each pair of wheels and are operatively connected at their proximate ends to a differential gear, one of which, for the axle section $g'$, is indicated conventionally at $h$. The differential gear $h$ has a master gear $h'$ thereon engaged by a driving gear which in the illustrated embodiment is a worm $i$. The differential gear for the axle section $f'$ is illustrated conventionally at $k$ and its master gear at $k'$.

The propeller shaft of the vehicle is illustrated at $l$. Known types of drives, whether of the worm, bevel gear or chain type, have usually taken the power from the propeller shaft $l$ to the differential gears for the pairs of wheels, so that differential movement between each of the wheels of a pair would be permitted in accordance with common practise. However, such differential gears have, as to each other, been positively interconnected so as to be driven at all times at equal speeds and with equal torque effort applied thereto. The essence of the present invention resides in the interposition between the differential gears, such $h$, $k$, means for insuring differential movement between such gears and apportionment of the load strains and speeds therebetween in accordance with traction conditions of the different wheels. One means for providing such differential movement is illustrated in the drawings. In this case the propeller shaft $l$ has keyed thereto a differential housing $m$ in which are supported a plurality of planetary pinions $m'$. These pinions mesh with driving bevel gears $n$, $o$ in a manner commonly employed in differentials of this type, one of these driving gears $n$ being keyed to a solid drive shaft $n'$ which is keyed to the worm $i$ for one pair of wheels $g$, and the other of said bevel gears $o$ being keyed to a hollow shaft $o'$ carrying a driving worm $p$ which meshes with the driving gear $k'$ for the differential $k$. The worm $p$ may be formed integral with or merely secured to the shaft $o'$. The solid shaft $n'$ in the illustrated embodiment extends through the hollow shaft $o'$.

The shaft $n'$ is preferably formed sectionally and has interposed therein between the worms $i$ and $p$ a universal joint $n^2$ which permits a degree of relative movement between the dead axles $c$, $e$ and the associated parts.

From the description given it is believed that the operation will be apparent. Power is delivered from the propeller shaft $l$ through the differential housing $m$ and gear $n$ to the drive shaft $n'$ for the worm $i$. Power is also delivered through the differential $m$ and gear $o$ to the drive shaft $o'$ for the worm $p$. The proportion of power delivered to the two differentials $k$, $h$ in this manner will depend on the usual variable factors in vehicle drives, but that degree of flexibility as between driving units is afforded which is necessary for a correct apportionment of power.

Not only is differential movement permitted as between the two wheels $g$ of a pair, as by means of the differential gear $h$, or between the two wheels $f$ of the other pair, as by means of the differential gear $k$, but differential movement is permitted as between either one of the shaft sections $f'$ or $g'$ by reason of the operative interposition therebetween of the differential gear $m$.

As pointed out before the necessary freedom of movement as between the two axle sections $c$, $e$, and their associated parts is afforded by the universal joint $n^2$ in the sectional shaft $n'$.

The scope of the invention will appear from the appended claims.

I claim as my invention:

1. In a motor truck, a plurality of pairs of drive wheels, driving axle sections for each of the wheels, differential gears interposed between the axle sections of each pair of wheels, a propeller shaft, and a differential gear and shafting aligned with the propeller shaft interposed operatively between said propeller shaft and said first named differential gears, respectively.

2. In a motor truck, a plurality of pairs of drive wheels, driving axle sections for each of the wheels, differential gears interposed between the axle sections of each pair of wheels, a propeller shaft, a second shaft disposed in substantial alignment with said propeller shaft, and an operative connection between the propeller shaft and each of said differential gears including a differential gear and said aligned shaft, said propeller shaft being connected to the housing of the last named differential to rotate it and the respective gears within the last named differential having operative connections, including said aligned shaft to the two first named differential gears.

3. In a motor truck, a tandem rear drive comprising the dead axles on which the pairs of wheels are mounted, driving shaft sections for each of the wheels, a differential gear to which the pairs of dead axles are connected, a worm gear carried by each differential gear, a worm meshing operatively with said worm gears respectively, a hollow shaft on which one of said worms is carried, a solid shaft extending through said hollow shaft and engaged with the other of said worms, a universal joint in said last named shaft, a differential gear including planetary pinions, a propeller shaft connected operatively with said planetary pinions and two driving gears engaged by said pinions, one of said gears being keyed to the said solid shaft and the other of said gears being keyed to said hollow shaft.

This specification signed this 4th day of June, A. D. 1920.

AUGUST H. LEIPERT.